United States Patent
Kamata et al.

(10) Patent No.: US 11,569,504 B2
(45) Date of Patent: Jan. 31, 2023

(54) POSITIVE ELECTRODE ACTIVE MATERIAL FOR LITHIUM ION SECONDARY BATTERIES AND METHOD FOR PRODUCING SAME

(71) Applicant: SUMITOMO METAL MINING CO., LTD., Tokyo (JP)

(72) Inventors: Yasutaka Kamata, Niihama (JP); Yuji Kawakami, Niihama (JP); Tomomichi Nihei, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 76 days.

(21) Appl. No.: 16/765,640

(22) PCT Filed: Oct. 22, 2018

(86) PCT No.: PCT/JP2018/039251
§ 371 (c)(1),
(2) Date: Sep. 18, 2020

(87) PCT Pub. No.: WO2019/102766
PCT Pub. Date: May 31, 2019

(65) Prior Publication Data
US 2021/0020933 A1 Jan. 21, 2021

(30) Foreign Application Priority Data
Nov. 21, 2017 (JP) .............................. JP2017-223441

(51) Int. Cl.
*H01M 4/525* (2010.01)
*C01D 15/02* (2006.01)
(Continued)

(52) U.S. Cl.
CPC ............. *H01M 4/525* (2013.01); *C01D 15/02* (2013.01); *C01G 53/04* (2013.01);
(Continued)

(58) Field of Classification Search
CPC .............. H01M 4/525; H01M 10/0525; H01M 2004/028; C01D 15/02; C01G 53/04;
(Continued)

(56) References Cited

U.S. PATENT DOCUMENTS

| | | | |
|---|---|---|---|
| 2009/0272940 A1* | 11/2009 | Kikuya | C01G 53/42 252/182.1 |
| 2011/0281168 A1* | 11/2011 | Watanabe | C01G 53/42 429/223 |
| 2015/0372300 A1* | 12/2015 | Imaizumi | H01M 4/525 252/182.1 |

FOREIGN PATENT DOCUMENTS

| | | | |
|---|---|---|---|
| JP | H07-114915 A | | 5/1995 |
| JP | H11-111290 A | | 4/1999 |

(Continued)

OTHER PUBLICATIONS

English Translation of JP 2017043496 (Year: 2017).*
International Search Report dated Jan. 22, 2019, issued for PCT/JP2018/039251.

*Primary Examiner* — Andrew J. Oyer
(74) *Attorney, Agent, or Firm* — Locke Lord LLP; James E. Armstrong, IV; Nicholas J. DiCeglie, Jr.

(57) ABSTRACT

The production method is a method for producing a positive electrode active material for a lithium ion secondary battery which contains at least nickel and lithium, the method including: a firing process in which a mixture of a nickel compound powder and a lithium compound powder is fired; and a water washing process in which a lithium-nickel composite oxide powder obtained in the firing process is washed with water, wherein the firing process is performed under conditions such that a value obtained by dividing a ratio of an amount-of-substance of lithium to a total amount-of-substance of transition metals other than lithium in the lithium-nickel composite oxide powder after the washing (Continued)

with water by a ratio of an amount-of-substance of lithium to a total amount-of-substance of transition metals other than lithium in the lithium-nickel composite oxide powder before the washing with water exceeds 0.95.

15 Claims, 2 Drawing Sheets

(51) Int. Cl.
*C01G 53/04* (2006.01)
*H01M 10/0525* (2010.01)
*H01M 4/02* (2006.01)

(52) U.S. Cl.
CPC ..... *H01M 10/0525* (2013.01); *C01P 2004/61* (2013.01); *H01M 2004/028* (2013.01)

(58) Field of Classification Search
CPC ........ C01G 53/42; C01G 53/00; C01G 53/50; C01P 2004/61; C01P 2002/54; C01P 2004/51; C01P 2006/80; Y02E 60/10
See application file for complete search history.

(56) References Cited

FOREIGN PATENT DOCUMENTS

| | | | |
|---|---|---|---|
| JP | 2000-133249 | A | 5/2000 |
| JP | 2000-173599 | A | 6/2000 |
| JP | 2002-170562 | A | 6/2002 |
| JP | 2007-119266 | A | 5/2007 |
| JP | 2008-117729 | A | 5/2008 |
| JP | 2011-146309 | A | 7/2011 |
| JP | 2017043496 | A * | 3/2017 |
| WO | 2010064440 | A1 | 6/2010 |
| WO | 2014115380 | A1 | 7/2014 |

* cited by examiner

POSITIVE ELECTRODE ACTIVE MATERIAL FOR LITHIUM ION SECONDARY BATTERIES AND METHOD FOR PRODUCING SAME

TECHNICAL FIELD

The present invention relates to a positive electrode active material for a lithium ion secondary battery and a method for producing the same, and particularly relates to a positive electrode active material for a high-output lithium ion secondary battery which includes a lithium-nickel composite oxide and a method for producing the same.

BACKGROUND ART

Along with a recent rapid expansion of production of compact information terminals such as smartphones and tablet terminals, demands for lithium ion secondary batteries as high-capacity secondary batteries have rapidly increased. Since lithium ion secondary batteries are compact and have a high energy density, they have already been widely used as power sources for compact information terminals, and research and development of their application as large power sources to be installed in hybrid cars and electric cars are under progress.

As positive electrode active materials for use in lithium ion secondary batteries, lithium-transition metal composite oxides are widely used. Particularly, a lithium-cobalt composite oxide ($LiCoO_2$) that can relatively easily be synthesized has heretofore been mainly used. However, since a rare and expensive cobalt compound is used as a raw material to synthesize the lithium-cobalt composite oxide, the cost of the raw material of positive electrode active materials increases, which eventually increases prices of lithium ion secondary batteries. A reduction in the raw material costs of positive electrode active materials in order to achieve the production of less-expensive lithium ion secondary batteries is thus highly significant from an industrial viewpoint because this leads to a reduction in the costs of secondary batteries now commonly used for compact information terminals or cars, and further makes it possible to install lithium ion secondary batteries in future large power sources.

Under the circumstances, a lithium-nickel composite oxide ($LiNiO_2$) has attracted attention as another lithium-transition metal composite oxide that can be used as a positive electrode active material for a lithium ion secondary battery. A lithium-nickel composite oxide has advantages that it has a larger charge and discharge capacity per mass than a lithium-cobalt composite oxide that is now dominantly used and that it is made from a nickel compound which is less expensive and stably available as compared with a cobalt compound. Therefore, a lithium-nickel composite oxide has been expected as a next-generation positive electrode active material and thus it is under active research and development.

However, a lithium-nickel composite oxide has the following problem: a lithium-nickel composite oxide is poor in productivity in industrial mass production because it is decomposed by elimination of oxygen from a crystal at a lower temperature than a lithium-cobalt composite oxide, and therefore the temperature of a synthesis reaction between a lithium compound and a nickel compound cannot be increased, and firing time needs to be increased to allow the reaction to sufficiently proceed to form organized crystal.

Patent Literatures 1 to 4 disclose methods for producing the lithium-nickel composite oxide, in which a lithium compound and a nickel compound are mixed and subjected to thermal treatment in order to improve battery characteristics. These Literatures 1 to 4 propose optimization of the time and temperature of a synthesis reaction and the composition of an atmosphere gas for the synthesis reaction. Further, Patent Literatures 5 to 7 propose various synthesis methods including firing of a lithium-transition metal composite oxide. Further, Patent Literature 8 discloses a method including a water washing process to improve the properties of a positive electrode active material.

CITATION LIST

Patent Literatures

Patent Literature 1: JP 7-114915 A
Patent Literature 2: JP 11-111290 A
Patent Literature 3: JP 2000-133249 A
Patent Literature 4: JP 2007-119266 A
Patent Literature 5: JP 2002-170562 A
Patent Literature 6: JP 2000-173599 A
Patent Literature 7: JP 2008-117729 A
Patent Literature 8: JP 2011-146309 A

SUMMARY OF INVENTION

Technical Problem

However, it is difficult for the techniques disclosed in Patent Literatures 1 to 8 to industrially and stably mass-produce a positive electrode active material for a lithium ion secondary battery which is excellent in battery performance. Under the above circumstances, it is an object of the present invention to provide a lithium-nickel composite oxide excellent in battery performance as a positive electrode active material for a high-output lithium ion secondary battery by a method capable of industrially and stably mass-producing it.

Solution to Problem

In order to achieve the above object, the present inventors have studied the synthesis of a positive electrode active material, and as a result have found that a positive electrode active material having stable battery performance can industrially be mass-produced by controlling the ratio of the amount-of-substance of lithium contained in a lithium-nickel composite oxide before washing with water to that after washing with water in a positive electrode active material production method including: a firing process in which a powder raw material containing a nickel compound and a lithium compound is fired to generate a lithium-nickel composite oxide; and a water washing process in which the composite oxide is washed with water after the firing process. This finding has led to the completion of the present invention.

More specifically, the present invention is directed to a method for producing a positive electrode active material for a lithium ion secondary battery which contains at least nickel and lithium, the method including: a firing process in which a mixture of a nickel compound powder and a lithium compound powder is fired; and a water washing process in which a lithium-nickel composite oxide powder obtained in the firing process is washed with water, wherein the firing process is performed under conditions such that a value obtained by dividing a ratio of an amount-of-substance of lithium to a total amount-of-substance of transition metals other than lithium in the lithium-nickel composite oxide powder after the washing with water by a ratio of an amount-of-substance of lithium to a total amount-of-substance of transition metals other than lithium in the lithium-nickel composite oxide powder before the washing with water exceeds 0.95.

The present invention is also directed to a positive electrode active material for a lithium ion secondary battery, the positive electrode active material including a lithium-nickel composite oxide, wherein when the positive electrode active material is washed with water by adding 0.75 mass parts of the positive electrode active material to 1 mass part of pure water to prepare a mixture, stirring the mixture for 30 minutes, and drying solid matter obtained by subjecting the mixture to solid-liquid separation, a value obtained by dividing a ratio of an amount-of-substance of lithium to a total amount-of-substance of transition metals other than lithium in the lithium-nickel composite oxide powder after the washing with water by a ratio of an amount-of-substance of lithium to a total amount-of-substance of transition metals other than lithium in the lithium-nickel composite oxide powder before the washing with water exceeds 0.95.

Advantageous Effects of Invention

According to the present invention, it is possible to industrially mass-produce a positive electrode active material having stable battery performance.

DESCRIPTION OF EMBODIMENTS

Figure 1:
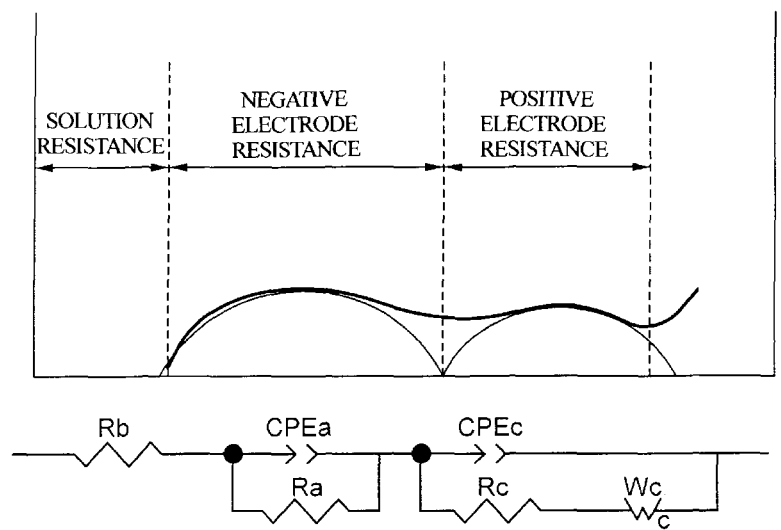
FIG. 1 is a schematic explanatory diagram showing a measurement example for impedance evaluation and an equivalent circuit used for analysis.

Hereinbelow, an embodiment of a method for producing a positive electrode active material for a lithium ion secondary battery according to the present invention will be described in detail. The method for producing a positive electrode active material according to the embodiment of the present invention includes: a firing process in which a mixture of a nickel compound powder and a lithium compound powder is fired; and a water washing process in which a lithium-nickel composite oxide powder obtained in the firing process is washed with water. When a lithium-nickel composite oxide powder used as a positive electrode active material for a lithium ion secondary battery is industrially produced, generally, a mixture of a nickel compound powder and a lithium compound powder is filled in ceramic firing containers, and then the containers filled with the mixture are continuously introduced into a continuous firing furnace such as a roller hearth kiln or a pusher furnace to perform firing at a predetermined temperature for a predetermined time. This causes a synthesis reaction so that a lithium-nickel composite oxide powder is generated from the mixture.

A ceramic rectangular container is used for the firing container in application of industrial production, which generally has inside dimensions ranging from 100 mm(L)× 100 mm(W)×20 mm (H) to 500 mm(L)×500 mm(W)×120 mm(H). This container is filled with a mixture of a lithium compound powder and a nickel compound powder as raw materials so that the height of the mixture from the bottom surface of the container falls in the range of 10 to 110 mm.

In order to improve the productivity of the firing process, the amount of the mixture fired per unit time may be increased by increasing the conveying speed of the firing container in the continuous firing furnace to reduce firing time or by increasing the amount of the mixture filled in the firing container. However, if the conveying speed is too high, the following problem may arise: the time for a synthesis reaction between the nickel compound powder and the lithium compound powder is short, and therefore battery performance is degraded due to insufficient crystal growth of particles constituting the lithium-nickel composite oxide powder. On the other hand, if the amount of the mixture filled in the firing container is too large, the depth from the top surface of the mixture filled in the container to the bottom of the container is too deep, and therefore oxygen required for the reaction is not sufficiently distributed to the mixture present near the bottom of the container. As a result, the synthesis reaction represented by the following formula 1 is less likely to successfully proceed, and therefore a problem such as a reduction in discharge capacity may occur due to insufficient synthesis of a lithium-nickel composite oxide.

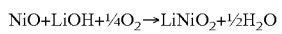

$$NiO+LiOH+\tfrac{1}{4}O_2 \rightarrow LiNiO_2+\tfrac{1}{2}H_2O \quad \text{[Formula 1]}$$

Therefore, in order to synthesize a lithium-nickel composite oxide powder that achieves excellent battery performance as a positive electrode active material, it is preferred that oxygen required for the reaction between the nickel compound powder and the lithium compound powder is sufficiently distributed throughout the mixture of them, and is particularly distributed to the bottom of the firing container. In this regard, the present inventors have found that in the reaction between the nickel compound powder and the lithium compound powder, oxygen does not need to sufficiently be distributed throughout the mixture over the full temperature range in the firing process, and oxygen can sufficiently be distributed throughout the mixture as long as oxygen diffusion time depending on the depth of the mixture in the firing container can be secured in a temperature range important for the reaction, specifically in the firing temperature range of 450° C. or higher and 650° C. or lower during firing of the mixture, in which case a lithium-nickel composite oxide powder having excellent battery performance can be obtained even when the amount of the mixture filled in the firing container is large, and therefore the depth from the top surface of the mixture to the bottom of the container is deep.

More specifically, depending on the kind of lithium compound, a solid phase-solid phase reaction or a liquid phase-solid phase reaction between a lithium compound and a nickel compound most significantly proceeds in the firing temperature range of 450° C. or higher and 650° C. or lower. Therefore, when oxygen required for the reaction is sufficiently distributed throughout the mixture in such a temperature range, a sufficient reaction between the lithium compound and the nickel compound can be provided to obtain a lithium-nickel composite oxide powder. It is to be noted that the firing temperature can be measured by, for example, a thermometer provided in the furnace.

For example, when a mixture of a lithium hydroxide powder and a nickel composite oxide powder is prepared as a raw material, and the temperature of the mixture is gradually increased, a reaction for the synthesis of a lithium-nickel composite oxide starts at about 450° C. When the temperature exceeds about 460° C. that is the melting point of lithium hydroxide, lithium hydroxide melts and reacts with a nickel composite oxide. If oxygen is not sufficiently distributed to the bottom of the firing container in this temperature range, unreacted melted lithium hydroxide reacts with the ceramic firing container so that the amount of lithium hydroxide to be reacted with a nickel composite oxide becomes practically insufficient. As a result, lithium-deficient sites are present in a generated lithium-nickel composite oxide, which causes degradation of battery performance. Therefore, it is important to sufficiently supply oxygen to the mixture to allow the reaction to remarkably proceed when the firing temperature during firing is 450° C. or higher that is a temperature range in which a sufficient reaction rate is achieved due to melting of lithium hydroxide.

On the other hand, if unreacted lithium hydroxide and nickel composite oxide are still present and supply of oxygen to them is insufficient even after the firing temperature reaches 650° C., a side reaction represented by the following formula 2 occurs so that a different phase that prevents the migration of lithium ions during a battery reaction is generated in a generated lithium-nickel composite oxide crystal, which causes degradation of battery performance.

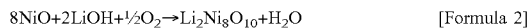

$$8NiO + 2LiOH + \tfrac{1}{2}O_2 \rightarrow Li_2Ni_8O_{10} + H_2O \qquad \text{[Formula 2]}$$

It is to be noted that as described above, when the firing temperature is in the range of 450° C. or higher and 650° C. or lower, there is little difference in the effect between when the firing temperature is maintained at a predetermined value and when the firing temperature is changed at, for example, a certain temperature rise rate, and the same effect can be obtained in both cases. Further, the reaction represented by the above formula 1 basically requires oxygen, and therefore an atmosphere gas during firing may be air having an oxygen concentration of about 20 vol %, but is preferably oxygen-rich air having a higher oxygen concentration. The oxygen concentration of the oxygen-rich air is preferably set to 60 vol % or more, more preferably 80 vol % or more by, for example, appropriately adjusting the mixing ratio between air and oxygen.

In order to ensure sufficient crystallinity in the synthesis of a lithium-nickel composite oxide to achieve high battery performance, the maximum firing temperature in the firing process is preferably 650° C. or higher and 850° C. or lower, the maximum firing temperature is preferably maintained for 2 hours or longer. If the maximum firing temperature is lower than 650° C., or the holding time to maintain the maximum firing temperature is shorter than 2 hours even when the maximum firing temperature is 650° C. or higher, the thereby-obtained lithium-nickel composite oxide may have insufficient crystallinity. On the other hand, if the maximum firing temperature exceeds 850° C., the thereby-obtained lithium-nickel composite oxide starts its decomposition reaction associated with oxygen release which may degrade battery performance due to disruption of a layered structure.

Even when the maximum firing temperature is lower than 650° C., prolonged firing can synthesize a lithium-nickel composite oxide having sufficient crystallinity without impairing battery performance. However, the firing time exceeding 24 hours is not preferable in consideration of industrial productivity. Therefore, the time required for the firing container filled with the mixture to pass through the firing furnace, that is, the time from the start of heating through temperature rise to the maximum firing temperature and maintaining at the maximum firing temperature to the completion of cooling is preferably 24 hours or shorter.

It is to be noted that when lithium hydroxide having water of crystallization is used as the lithium compound, a rapid increase of the firing temperature causes non-uniform temperature distribution of the mixture in the firing container which may lead to uneven synthesis reaction. Therefore, the firing time from the start of heating to the completion of maintaining at the maximum firing temperature is preferably 12 hours or longer. On the other hand, the use of anhydrous lithium hydroxide can shorten the time from the start of heating to the completion of maintaining at the maximum firing temperature to less than 12 hours.

The present inventors have found that when the lithium-nickel composite oxide powder is washed with water under predetermined conditions, a value obtained by dividing the ratio of the amount-of-substance of lithium to the total amount-of-substance of transition metals other than lithium in the lithium-nickel composite oxide powder after the washing with water by the ratio of the amount-of-substance of lithium to the total amount-of-substance of transition metals other than lithium in the lithium-nickel composite oxide powder before the washing with water (hereinafter, also referred to as a ratio between lithium metal ratios before and after washing with water) can effectively be used as an index for determining whether or not the above-described reaction for the synthesis of a lithium-nickel composite oxide from a nickel compound and a lithium compound has sufficiently proceeded. It is to be noted that the amount-of-substance is a physical amount expressed by mole that is the SI unit, and can be measured by an ICP emission spectrophotometer or the like.

In the production of a lithium-nickel composite oxide, a nickel compound and a lithium compound are usually mixed so that the amount-of-substance of lithium in the lithium compound is larger than 1 mole per mole of the amount-of-substance of nickel and an additive transition metal element contained in the nickel compound, and the mixture is fired. This is because if the amount-of-substance of lithium is smaller than the amount-of-substance of nickel and an additive transition metal element in a reaction for the synthesis of a lithium-nickel composite oxide, lithium deficiency may occur at lithium sites in the crystal of the lithium-nickel composite oxide, which results in an insufficient charge and discharge capacity, and the lithium sites with the lithium deficiency function as resistive layers in a charge and discharge reaction which increases the resistance of a secondary battery.

Therefore, even when a sufficient reaction for the synthesis of a lithium-nickel composite oxide occurs, the surplus lithium compound is still present in the lithium-nickel composite oxide after the synthesis reaction, and most of the surplus lithium compound is present on the surfaces and their vicinity of lithium-nickel composite oxide particles. The surplus lithium compound present on the surfaces and their vicinity of the particles is easily removed by washing with water, and therefore the ratio between lithium metal ratios before and after washing with water is usually less than 1.

On the other hand, when the ratio between lithium metal ratios before and after washing with water is close to 1, that is, when there is little difference between lithium metal ratios before and after washing with water, it can be considered that the amount of surplus lithium present on the surfaces of particles of the lithium-nickel composite oxide after the synthesis reaction is small. This situation can be result from a sufficient reaction of lithium used as a raw material which has been mostly solid-solved in nickel compound particles, such that an almost stoichiometric reaction for the synthesis of a lithium-nickel composite oxide has proceeded.

Therefore, in the method for producing a positive electrode active material including a lithium-nickel composite oxide according to the embodiment of the present invention, the ratio between lithium metal ratios before and after washing with water is adjusted to exceed 0.95. The ratio between lithium metal ratios is preferably 0.99 or more, more preferably 0.995 or more to achieve more excellent battery characteristics. It is to be noted that even though the upper limit of the ratio between lithium metal ratios before and after washing with water is usually less than 1 as described above, an insufficient reaction for the synthesis of a lithium-nickel composite oxide may cause elution of nickel and an additive transition metal element, which may result in a case where the ratio between lithium metal ratios before and after washing with water is larger than 1. Therefore, the ratio between lithium metal ratios before and after washing with water does not exceed 1 as long as the lithium-nickel composite oxide is generated by a sufficient synthesis reaction.

When the ratio between lithium metal ratios before and after washing with water is 0.95 or less, it can be made larger than 0.95 by appropriately adjusting conditions for firing in the previous process. For example, a nickel compound powder having a smaller volume-average particle diameter MV may be used as a raw material, or a nickel compound powder roasted at a higher temperature may be used as a raw material. Alternatively, the oxygen concentration of an atmosphere gas during firing may be increased, the maximum firing temperature during firing may be increased, or the holding time to maintain the maximum firing temperature may be increased.

In the embodiment of the method for producing a positive electrode active material according to the present invention, the nickel compound powder used as a raw material is not particularly limited, but nickel hydroxide or nickel oxide is preferred from the viewpoint that side reaction products other than water are less likely to be generated during the reaction. The volume-average particle diameter MV of the nickel compound powder is preferably 3 μm or more and 26 μm or less, more preferably 8 μm or more and 21 μm or less, most preferably 10 μm or more and 16 μm or less. On the other hand, the bulk density of the nickel compound powder is preferably 0.5 g/ml or more and 2.2 g/ml of less.

If the volume-average particle diameter MV of the nickel compound powder is less than 3 μm, a sufficient packing density cannot be achieved when an electrode is produced due to too small a particle diameter of a resulting positive electrode active material, which may result in a reduced battery capacity of a secondary battery due to a smaller amount of the positive electrode active material per unit volume of the secondary battery. On the other hand, if the volume-average particle diameter MV of the nickel compound powder exceeds 26 μm, the number of contact points between positive electrode active material particles or between positive electrode active material particles and a conductive aid is too small, which may result in a reduced battery capacity due to an increase in the resistance of a positive electrode.

If the bulk density of the nickel compound powder is less than 0.5 g/ml, the amount of the mixture of the lithium compound powder and the nickel compound powder filled in the firing container for firing process becomes smaller due to too low a bulk density of the mixture, which may significantly reduce the productivity. On the other hand, if the bulk density exceeds 2.2 g/ml, the mixture of the lithium compound powder and the nickel compound powder is densely filled, which may result in a situation where oxygen is less likely to diffuse into the mixture so that productivity is reduced due to an increase in time required for firing.

The carbon content of the nickel compound powder is preferably 0.25 mass % or less, more preferably 0.15 mass % or less, most preferably 0.07 mass % or less. As described above, when the carbon content of the nickel compound is as small as 0.25 mass % or less, lithium can efficiently be solid-solved in the nickel compound, which makes it possible to significantly improve the output characteristic of the positive electrode active material. The reason why the solid-solving of lithium is efficiently achieved is not clear, but the present inventors have estimated that carbon contained in the nickel compound powder may mainly be derived from nickel carbonate or nickel carbide that is poorer in reactivity with the lithium compound as compared with nickel hydroxide or nickel oxide.

When nickel hydroxide is used as a raw material, the method for producing a positive electrode active material according to the embodiment of the present invention preferably includes, before the firing process, a preprocessing process in which the nickel compound powder is converted to a nickel oxide powder by roasting at a roasting temperature of preferably 500° C. or higher and 800° C. or lower. By roasting the nickel compound powder before firing in this way, it is also possible to reduce the carbon content of the nickel compound powder. It is to be noted that the roasting temperature can be measured by, for example, a thermometer provided in the furnace.

The lithium compound powder used as a raw material is not particularly limited, but is preferably lithium hydroxide or lithium carbonate or a mixture of them, more preferably anhydrous lithium hydroxide or lithium hydroxide monohydrate having a melting point of about 480° C. in consideration of reaction with the nickel compound, and most preferably anhydrous lithium hydroxide in consideration of productivity. Lithium hydroxide is preferable because it melts and proceeds a solid-liquid reaction with the nickel composite oxide which allows uniform reaction.

Since the reaction for the synthesis of a lithium-nickel composite oxide is basically a solid-phase reaction, the synthesis reaction proceeds readily when the lithium compound powder and the nickel compound powder used as raw materials are homogeneously mixed. For this reason, the particle size of the lithium compound powder is preferably close to that of the nickel compound powder. As described above, since the particle size of the nickel compound powder expressed as a volume-average particle diameter MV is preferably 3 μm or more and 26 μm or less, the volume-average particle diameter MV of the lithium compound powder is preferably 26 μm or less, more preferably 21 μm or less, most preferably 16 μm or less. However, if the particle size of the lithium compound powder is 5 µm or less, energy required for grinding is too high, which causes an increase in cost, and the bulk density of the mixture of the raw materials is too low, which requires a firing furnace having a large capacity. Therefore, from a practical viewpoint, the volume-average particle diameter MV of the lithium compound powder is preferably 5 µm or more, more preferably 10 µm or more.

In the embodiment of the method for producing a positive electrode active material according to the present invention, the lithium-nickel composite oxide powder obtained by firing is washed with water so that, as described above, surplus lithium present on the surfaces or their vicinity of the particles is removed, which provides a high-capacity and safety positive electrode active material for a lithium ion secondary battery. Conditions for the washing with water are not particularly limited, and a known water washing technique can be used. However, the washing with water is preferably performed by the following method.

Specifically, the lithium-nickel composite oxide powder is added in an amount of preferably 0.5 to 2 mass parts, more preferably 0.75 mass parts to 1 mass part of water at preferably about 10 to 15° C. contained in a container equipped with a stirrer, and the mixture is stirred for preferably about 15 to 60 minutes, more preferably about 30 minutes to sufficiently remove surplus lithium present on the surfaces or their vicinity of the lithium-nickel composite oxide particles. The slurry after washing with water may be subjected to solid-liquid separation and drying by a general method. If the amount of the lithium-nickel composite oxide powder added exceeds 2 mass parts, the stirring of the slurry may become difficult due an excessive increase of a viscosity of the slurry, and further the dissolution rate of adhesive substances may be reduced by chemical equilibrium due to an increase of alkali content in the slurry, or separation of the adhesive substances from the powder may become difficult even when the adhesive substances are peeled off.

On the other hand, if the amount of the lithium-nickel composite oxide powder added is less than 0.5 mass parts, elution of lithium is promoted because the concentration of the slurry is too low, which causes elimination of lithium from the crystal lattice of the lithium-nickel composite oxide particles as a positive electrode active material. This situation not only easily causes crystal collapse but also causes re-precipitation of lithium carbonate due to absorption of carbon dioxide in the atmosphere into a high-pH aqueous solution of the slurry.

Water used in the washing with water is not particularly limited, but pure water having an electric conductivity of less than 10 µS/cm is preferred, and pure water having an electric conductivity of 1 µS/cm or less is more preferred. More specifically, the use of pure water having an electric conductivity of less than 10 µS/cm makes it possible to prevent a reduction in battery performance caused by adhesion of impurities to the lithium-nickel composite oxide particles as a positive electrode active material. After the slurry is subjected to solid-liquid separation, the amount of adhesion water remaining on the surfaces of the particles is preferably small. If the amount of adhesion water is large, lithium dissolved in the adhesion water is re-precipitated so that the lithium amount remaining on the surface of the lithium-nickel composite oxide powder after subsequent drying increases. Therefore, a solid-liquid separator used for solid-liquid separation performed after washing with water is preferably one capable of achieving a low water content of solid matter after solid-liquid separation, such as a centrifugal separator or a filter press.

Conditions for drying performed after the solid-liquid separation are not particularly limited, but a wet powder cake obtained by the solid-liquid separation is preferably dried at a drying temperature of 80° C. or higher and 550° C. or lower using a dryer capable of controlling an atmosphere in its chamber so that the chamber is filled with a gas atmosphere containing no carbon compound component nor sulfur compound component or a vacuum atmosphere. The reason why the drying temperature during drying is set to 80° C. or higher is to quickly dry the lithium-nickel composite oxide particles after the washing with water as a positive electrode active material to prevent the generation of concentration gradient of lithium between the surface and inside of the particles.

On the other hand, the reason why the drying temperature is set to 550° C. or lower is that it is supposed that the surfaces and their vicinity of the lithium-nickel composite oxide particles as a positive electrode active material are in an approximately stoichiometric state or close to a charged state due to slight elimination of lithium, and therefore if the drying temperature higher than 550° C. may trigger distortion of crystal structure of the powder close to a charged state, which may deteriorate electrical characteristics. The drying temperature during drying is more preferably 120 to 350° C. in consideration of productivity and heat energy cost. It is to be noted that the drying temperature can be measured by, for example, a thermometer provided in the dryer.

The method for producing a positive electrode active material according to the embodiment of the present invention makes it possible to mass-produce a positive electrode active material having stable quality. Further, since the ratio between lithium metal ratios before and after washing with water is high, lithium loss can be reduced, and its synergy with the above-described mass productivity makes it possible to reduce the production cost of a battery, which is essential for widespread use of lithium ion secondary batteries as power sources for electric cars. Therefore, it can be said that the industrial value of the method for producing a positive electrode active material according to the embodiment of the present invention is very high. It is to be noted that the power sources for electric cars include not only power sources for electric cars driven only by electric energy but also power sources for so-called hybrid cars also using a combustion engine such as a gasoline engine or diesel engine.

The above-described production method according to the embodiment of the present invention makes it possible to generate various lithium-nickel composite oxides, and they can be used for industrial production of positive electrode active materials for lithium ion secondary batteries. More specifically, a lithium-nickel composite oxide represented by the composition formula, $Li_xNi_{1-y-z}M_yN_zO_2$ can be generated. In the above formula, M is at least one element selected from Co and Mn, N is at least one element selected from Al, Ti, Nb, V, Mg, W, and Mo, x, y, and z preferably satisfy $0.90 \leq x \leq 1.10$, $0.05 \leq y \leq 0.35$, $0.005 \leq z \leq 0.05$, respectively, and y and z more preferably satisfy $y+z \leq 0.20$.

When a lithium-nickel composite oxide having the above composition is produced, a nickel compound powder used as a raw material is a powder of a composite oxide of nickel and another transition metal (also referred to as a nickel composite oxide) or a powder of a composite hydroxide of nickel and another transition metal (also referred to as a nickel composite hydroxide). These powders can be produced in accordance with a known method. For example, a nickel composite hydroxide powder can be obtained by coprecipitating nickel, cobalt or manganese, and an additive element N.

Oxidization roasting of the obtained nickel composite hydroxide powder produces a nickel composite oxide where cobalt or manganese and the additive element N are solid-solved in nickel oxide. It is to be noted that a nickel composite oxide can be produced also by a method in which nickel oxide and oxides of other additive elements are ground and mixed. Application of a lithium-nickel composite oxide produced by the above-described production method according to the embodiment of the present invention to a positive electrode active material for a lithium ion secondary battery can produce a high-output secondary battery having stable quality.

A method for producing a positive electrode for a lithium ion secondary battery using the above-described positive electrode active material for a lithium ion secondary battery including a lithium-nickel composite oxide powder is not limited, but a positive electrode can be produced by, for example, the following method. Specifically, the powdered positive electrode active material, a conductive material, and a binding agent are mixed, and if necessary, activated carbon is further added. The thus obtained mixture is kneaded with a solvent used for viscosity adjustment to prepare a positive electrode mixture paste. The mixing ratio among the above-described raw materials constituting the positive electrode mixture paste is a factor that determines the performance of a lithium ion secondary battery. When the total mass of solid matter in the positive electrode mixture except for the solvent is defined as 100 mass parts, it is preferred that, as in the case of a positive electrode for a general lithium ion secondary battery, the content of the positive electrode active material is 60 to 95 mass parts, the content of the conductive material is 1 to 20 mass parts, and the content of the binding agent is 1 to 20 mass parts.

The obtained positive electrode mixture paste is applied onto, for example, the surface of a current collector made of aluminum foil and dried to volatilize the solvent. At this time, if necessary, pressure may be applied by a roll press or the like to increase an electrode density. In this way, a sheet-shaped positive electrode can be produced. The obtained sheet-shaped positive electrode is cut to have an appropriate size depending on the kind and size of a battery to be produced, and then subjected to a battery assembly process.

Examples of the conductive material to be used include graphite (e.g., natural graphite, artificial graphite, expanded graphite) and carbon black-based materials such as acetylene black and ketjen black. The binding agent plays the role of binding active material particles together, and examples thereof to be used include polyvinylidene fluoride (PVDF), polytetrafluoroethylene (PTFE), fluorine-containing rubber, ethylene propylene diene rubber, styrene butadiene, cellulose-based resins, and polyacrylic acid. In the mixture of the positive electrode active material, the conductive material, and the binding agent, activated carbon is optionally dispersed to increase an electric double-layer capacity, and a solvent is added to the thus obtained positive electrode mixture to dissolve the binding agent. As the solvent, an organic solvent such as N-methyl-2-pyrrolidone may be used. The positive electrode mixture mixed with the solvent is preferably kneaded by a general kneader to produce a uniform positive electrode mixture paste.

A negative electrode to be used as a counter electrode of the above-described positive electrode is metallic lithium, an lithium alloy or the like, or one formed by applying, onto the surface of a metal foil current collector made of copper or the like, a paste-like negative electrode mixture obtained by mixing a negative electrode active material capable of storing and releasing lithium ions with a binding agent and further adding a solvent thereto, drying the negative electrode mixture, and then optionally compressing the negative electrode mixture to increase an electrode density. Examples of the negative electrode active material to be used include powders of carbon substances such as natural graphite, artificial graphite, a fired body of an organic compound such as a phenol resin, and coke. As in the case of the positive electrode, the negative electrode binding agent to be used may be a fluorine-containing resin such as PVDF, and the solvent used to disperse the active material and the binding agent may be an organic solvent such as N-methyl-2-pyrrolidone. A separator is interposed between the positive electrode and the negative electrode. The separator is used to separate the positive electrode and the negative electrode from each other and hold an electrolyte, and may be a thin film made of polyethylene, polypropylene, or the like and having a plurality of micro pores.

A non-aqueous electrolyte solution is obtained by dissolving a lithium salt as a supporting salt in an organic solvent. Examples of the organic solvent to be used include: cyclic carbonates such as ethylene carbonate, propylene carbonate, butylene carbonate, and trifluoropropylene carbonate; chain carbonates such as diethyl carbonate, dimethyl carbonate, ethyl methyl carbonate, and dipropyl carbonate; ether compounds such as tetrahydrofuran, 2-methyl tetrahydrofuran, and dimethoxyethane; sulfur compounds such as ethyl methyl sulfone and butanesultone; and phosphorus compounds such as triethyl phosphate and trioctyl phosphate, and these organic solvents may be used singly or in combination of two or more of them. The supporting salt to be used may be one selected from $LiPF_6$, $LiBF_4$, $LiClO_4$, $LiAsF_6$, and $LiN(CF_3SO_2)_2$ or a combined salt of two or more of them. The non-aqueous electrolyte solution may further include at least one selected from a radical scavenger, a surfactant, and a flame retardant.

Lithium ion secondary batteries constituted from the positive electrode, the negative electrode, the separator, and the non-aqueous electrolyte solution may be of various types such as a cylindrical type and a stacked type. Irrespective of the type of lithium ion secondary battery, a lithium ion secondary battery can be assembled in the following manner: the positive electrode and the negative electrode are stacked with the separator being interposed between them to form an electrode assembly, the obtained electrode assembly is impregnated with the non-aqueous electrolyte solution, a positive electrode current collector and a positive electrode terminal leading to the outside are connected using a current collecting lead or the like and a negative electrode current collector and a negative electrode terminal leading to the outside are connected using a current collecting lead or the like, they are accommodated in a battery case, and the battery case is hermetically sealed.

A lithium ion secondary battery using the positive electrode active material according to the embodiment of the present invention has a high capacity and a high output. Particularly, when the positive electrode active material according to the embodiment of the present invention is used for a positive electrode of, for example, a 2032-type coin battery as a more preferred embodiment of the lithium ion secondary battery, the 2032-type coin battery achieves a high initial discharge capacity of 165 mAh/g or more and a low positive electrode resistance, and further has a high capacity and a high output. Further, it can be said that thermal stability is high and safety is excellent.

It is to be noted that the positive electrode resistance can be measured by, for example, the following method. When the frequency dependence of a battery reaction is measured by an AC impedance method generally used as an electrochemical evaluation method, a Nyquist diagram based on solution resistance, negative electrode resistance and negative electrode capacity, and positive electrode resistance and positive electrode capacity is obtained as shown in FIG. 1. The battery reaction at an electrode comprises a resistance component associated with charge transfer and a capacity component of an electric double layer. When these components are represented using an electric circuit, the electric circuit is a parallel circuit of resistance and capacity, and the entire of a battery is represented as an equivalent circuit in which solution resistance, a parallel circuit of a negative electrode, and a parallel circuit of a positive electrode are connected in series.

Each of the resistance components and the capacity components can be estimated by performing fitting calculation on the measured Nyquist diagram using this equivalent circuit. The positive electrode resistance is equal to the diameter of a semicircle on the lower frequency side in the obtained Nyquist diagram. Therefore, the positive electrode resistance can be estimated by performing AC impedance measurement on a positive electrode produced to obtain a Nyquist diagram and performing fitting calculation on the Nyquist diagram using an equivalent circuit. Hereinbelow, the present invention will specifically be described with reference to examples, but is not limited by these examples.

EXAMPLES

Figure 2:
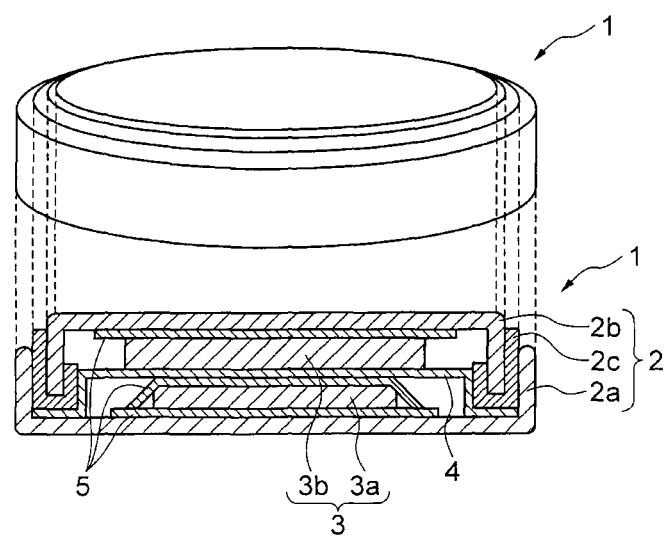
FIG. 2 shows a schematic perspective view and a cross sectional view of a coin-type battery produced for battery evaluation in Examples of the present invention.

A positive electrode active material was generated by the following method, a secondary battery having a positive electrode produced using the obtained positive electrode active material was assembled, and the initial discharge capacity and positive electrode resistance of the secondary battery were measured to evaluate battery performance. The evaluation of battery performance was performed by producing a 2032-type coin batter 1 (hereinafter, referred to as a coin-type battery) having a structure shown in FIG. 2. More specifically, the coin-type batter 1 shown in FIG. 2 includes a case 2 having an almost cylindrical shape and an electrode 3 accommodated in the case 2.

The case 2 includes a hollow positive electrode can 2a having an opening at one end and a hollow negative electrode can 2b having an opening at one end and placed inside the positive electrode can 2a so that the opening is opposed to the opening of the positive electrode can 2a. By arranging the negative electrode can 2b and the positive electrode can 2a in such a manner that their openings are opposed to each other, a space for accommodating the electrode 3 is formed by the negative electrode can 2b and the positive electrode can 2a. The electrode 3 includes a positive electrode 3a, a separator 4, and a negative electrode 3b, and the positive electrode 3a, the separator 4, and the negative electrode 3b are stacked in this order from the positive electrode can 2a side so that they can be accommodated in the case 2 in a state where the positive electrode 3a abuts against the inner surface of the positive electrode can 2a with a current collector 5 being interposed between them, and the negative electrode 3b abuts against the inner surface of the negative electrode can 2b with a current collector 5 being interposed between them. It is to be noted that a current collector 5 is interposed also between the positive electrode 3a and the separator 3c.

A gasket 2c is provided between the periphery of the positive electrode can 2a and the periphery of the negative electrode can 2b. The positive electrode can 2a and the negative electrode can 2b can be fixed by the gasket 2c so as not to come into contact with each other to prevent relative movement between them. The gasket 2c also has the function of sealing the gap between the positive electrode can 2a and the negative electrode can 2b to air-tightly and liquid-tightly cut off the inside of the case 2 from the outside.

The coin-type batter 1 for evaluation was produced by the following method. First, 52.5 mg of a positive electrode active material, 15 mg of acetylene black, and 7.5 mg of a polytetrafluoroethylene (PTFE) resin were mixed while being ground in a mortar, and the thus obtained mixture was press-molded at a pressure of 100 MPa to have a diameter of 11 mm and a thickness of 100 µm. In this way, the positive electrode 3a was produced. The produced positive electrode 3a was dried in a vacuum dryer at 120° C. for 12 hours before use.

The negative electrode 3b was produced by applying a mixture of a graphite powder having a volume-average particle diameter MV of 20 µm and polyvinylidene fluoride onto a copper foil to obtain a negative electrode sheet and punching the negative electrode sheet to obtain a disc-shaped sheet having a diameter of 14 mm. The separator 4 was a polyethylene porous membrane having a thickness of 25 µm. As an electrolyte solution, a mixed solution of equal parts of ethylene carbonate (EC) and diethyl carbonate (DEC) using 1 M $LiClO_4$ as a supporting electrolyte (manufactured by Toyama Pure Chemical Industries, Ltd.) was used.

The coin-type batter 1 was assembled using these positive electrode 3a, negative electrode 3b, separator 4, and electrolyte solution in a glove box filled with an Ar atmosphere whose dew point was controlled at −80° C. The initial discharge capacity and positive electrode resistance of the produced coin-type batter 1 were measured by the following methods to evaluate battery performance.

The initial discharge capacity was evaluated in the following manner. The coin-type batter 1 was allowed to stand at room temperature for 24 hours after production. After the open circuit voltage (OCV) of the coin-type batter 1 was stabilized, a current density for the positive electrode was set to 0.1 $mA/cm^2$, and the coin-type batter 1 was charged to a cutoff voltage of 4.3 V. After a 1-hour pause, the coin-type batter 1 was discharged to a cutoff voltage of 3.0 V, and the capacity of the coin-type batter 1 at this time was defined as an initial discharge capacity.

The coin-type batter 1 was charged to a charging potential of 4.1 V and subjected to measurement by an AC impedance method using a frequency response analyzer and a potentiogalvanostat (manufactured by Solartron, 1255B) to obtain a Nyquist plot as shown in FIG. 1. The Nyquist plot is expressed as the sum of characteristic curves showing solution resistance, negative electrode resistance and negative electrode capacity, and positive electrode resistance and positive electrode capacity. Therefore, fitting calculation was performed using an equivalent circuit on the basis of the Nyquist plot to calculate the value of positive electrode resistance. Lithium-nickel composite oxides according to examples of the present invention used as the above-described positive electrode active material will specifically be described below.

Example 1

A nickel compound powder used as a raw material was a nickel composite hydroxide powder generated by a known crystallization method. More specifically, a 2 mol/L mixed aqueous solution of nickel sulfate and cobalt sulfate prepared to have a molar ratio between the amount-of-substance of nickel and the amount-of-substance of cobalt of 88:9 and a 1 mol/L aqueous sodium aluminate solution were continuously dropped into a reaction tank containing a 2 mol/L aqueous sodium sulfate solution with stirring so that the molar ratio among the amount-of-substance of nickel, the amount-of-substance of cobalt, and the amount-of-substance of aluminum was 88:9:3. At the same time, 28% ammonia water was added to the reaction tank so that the ammonia concentration of the solution in the reaction tank was 5 g/L, and a 40% aqueous sodium hydroxide solution was further added so that the pH in the reaction tank was 11.5 to 12.5. At this time, a reaction was allowed to proceed while the pH in the reaction tank was finely adjusted by adjusting the amount of the 40% aqueous sodium hydroxide solution added so that a desired particle size of a nickel composite hydroxide could be achieved.

A slurry containing a generated nickel composite hydroxide was collected by overflow from the reaction tank, and was filtered using a Buchner funnel to obtain a cake. One liter of a 40% aqueous sodium hydroxide solution and 19 L of deionized water were added per kilogram of the obtained cake, and the resulting mixture was stirred for 30 minutes and then filtered using a Buchner funnel to obtain a cake. Twenty liters of deionized water was added per kilogram of the obtained cake, and the resulting mixture was stirred for 30 minutes and then filtered using a Buchner funnel. This washing was repeated twice to obtain a nickel composite hydroxide cake. The obtained nickel composite hydroxide cake was placed in a stationary hot-air dryer and dried at a drying temperature of 110° C. for 24 hours to obtain a nickel composite hydroxide powder. The obtained nickel composite hydroxide powder had a volume-average particle diameter MV of 11.8 μm and a carbon content of 0.25 mass %.

A lithium compound powder used as the other raw material was lithium hydroxide. The lithium hydroxide was obtained in the following manner. Lithium hydroxide monohydrate ($LiOH.H_2O$) was dehydrated by vacuum drying to obtain anhydrous lithium hydroxide, and the anhydrous lithium hydroxide was ground by a jet mill to have an average particle diameter MV of 14.1 μm. It is to be noted that the volume-average particle diameter MV of the powder was measured using a particle size distribution measuring device based on a laser diffraction scattering method, and the carbon content of the nickel composite hydroxide powder was measured by a high-frequency combustion-infrared absorption method.

Then, the anhydrous lithium hydroxide powder and the nickel composite hydroxide powder were weighed so that the molar ratio between the amount-of-substance of lithium and the amount-of-substance of transition metals other than lithium was 1.020:1.000, and were well mixed. The obtained mixture was packed in a ceramic firing container having inside dimensions of 280 mm (L)×280 mm (W)×90 mm (H), and the firing container was placed in a roller hearth kiln as a continuous combustion furnace. The mixture was fired in an atmosphere gas having an oxygen concentration of 80 vol % in a temperature pattern in which the firing temperature measured by a thermometer provided in the furnace was increased from 600° C. to 765° C. at a constant temperature rise rate over about 100 minutes and then the maximum firing temperature of 765° C. was maintained for 210 minutes to synthesize a lithium-nickel composite oxide.

Then, 0.75 mass parts of the lithium-nickel composite oxide was added to 1 mass part of pure water at 15° C. contained in a container equipped with a stirrer and having an electric conductivity of 1 to 10 μS/cm to obtain a slurry, and the slurry was stirred for 30 minutes and then filtered to collect solid matter. The solid matter was placed in a vacuum dryer whose chamber pressure was 0.1 kPa or less and dried at a temperature of 110° C. for 12 hours. In this way, a lithium-nickel composite oxide as a positive electrode active material was obtained as Sample 1.

The lithium metal ratio (value obtained by dividing the amount-of-substance of lithium by the amount-of-substance of transition metal elements other than lithium) of the lithium-nickel composite oxide obtained as Sample 1 before washing with water was 1.030, and the lithium metal ratio of the lithium-nickel composite oxide after washing with water was 0.993. Therefore, the ratio between the lithium metal ratios before and after washing with water was 0.964 that was larger than 0.95. From the result, it is considered that the synthesis reaction proceeded almost stoichiometrically during firing so that a lithium-nickel composite oxide was generated with a little loss of lithium.

The battery characteristics of the coin-type batter 1 having a positive electrode produced using, as a positive electrode active material, the lithium-nickel composite oxide obtained as Sample 1 were evaluated. As a result, the initial discharge capacity was 203.8 mAh/g. The positive electrode resistance expressed as a relative value determined by taking the lowest positive electrode resistance among the positive electrode resistances of all the samples produced in Example 1 and Examples 2 and 3 that will be described later as 100 was 115.

Further, lithium-nickel composite oxides were synthesized as Samples 2 to 5 in the same manner as in the case of Sample 1 except that the particle size of anhydrous lithium hydroxide after grinding was set to 15.6 μm, 18.4 μm, 20.9 μm, or 25.3 μm instead of 14.1 μm, respectively, and their ratios between lithium metal ratios before and after washing with water were determined. As a result, the ratios between lithium metal ratios before and after washing with water of Samples 2 to 5 were 0.964, 0.961, 0.958, and 0.951, respectively.

Further, coin-type batteries were produced in the same manner as in the case of Sample 1 to evaluate battery characteristics. As a result, in the case of Sample 2, the initial discharge capacity was 200.9 mAh/g, and the relative value of positive electrode resistance was 140, in the case of Sample 3, the initial discharge capacity was 202.8 mAh/g, and the relative value of positive electrode resistance was 154, in the case of Sample 4, the initial discharge capacity was 200.3 mAh/g, and the relative value of positive electrode resistance was 205, and in the case of Sample 5, the initial discharge capacity was 201.4 mAh/g, and the relative value of positive electrode resistance was 258.

Example 2

A nickel composite hydroxide generated in the same manner as in Example 1 was roasted using a compact muffle furnace at a roasting temperature of 400° C. for 5 hours in an air atmosphere to generate a nickel composite oxide.

The obtained nickel composite oxide had a volume-average particle diameter MV of 11.8 μm and a carbon content of 0.21 mass %. It is to be noted that anhydrous lithium hydroxide used was the same as that used for Sample 5 and having an average particle diameter MV of 25.3 µm. A lithium-nickel composite oxide was synthesized as Sample 6 in the same manner as in Example 1, and battery characteristics were evaluated in the same manner as in Example 1. As a result, the ratio between lithium metal ratios before and after washing with water was 0.950, the initial discharge capacity was 201.5 mAh/g, and the relative value of positive electrode resistance was 266. Further, lithium-nickel composite oxides were synthesized as Samples 7 to 10 in the same manner as in the case of Sample 6 except that the roasting temperature during roasting using the compact muffle furnace was set to 500° C., 650° C., 700° C., or 750° C. instead of 400° C., respectively.

As a result, in the case of Sample 7, the nickel composite oxide had a volume-average particle diameter MV of 11.5 µm and a carbon content of 0.15 mass %, the ratio between lithium metal ratios before and after washing with water was 0.958, the initial discharge capacity was 208.6 mAh/g, and the relative value of positive electrode resistance was 222. In the case of Sample 8, the nickel composite oxide had a volume-average particle diameter MV of 11.6 µm and a carbon content of 0.066 mass %, the ratio between lithium metal ratios before and after washing with water was 0.963, the initial discharge capacity was 207.5 mAh/g, and the relative value of positive electrode resistance was 169. In the case of Sample 9, the nickel composite oxide had a volume-average particle diameter MV of 11.5 µm and a carbon content of 0.042 mass %, the ratio between lithium metal ratios before and after washing with water was 0.964, the initial discharge capacity was 209.0 mAh/g, and the relative value of positive electrode resistance was 166. In the case of Sample 10, the nickel composite oxide had a volume-average particle diameter MV of 11.5 µm and a carbon content of 0.029 mass %, the ratio between lithium metal ratios before and after washing with water was 0.965, the initial discharge capacity was 207.8 mAh/g, and the relative value of positive electrode resistance was 154.

Example 3

A nickel composite hydroxide generated in the same manner as in Example 1 was roasted using a compact muffle furnace at a roasting temperature of 650° C. for 5 hours in an air atmosphere to generate a nickel composite oxide. The obtained nickel composite oxide had a volume-average particle diameter MV of 11.6 µm and a carbon content of 0.066 mass %. It is to be noted that anhydrous lithium hydroxide used was the same as that used for Sample 3 and having an average particle diameter MV of 18.4 µm.

They were mixed under the same conditions as in Example 1, and the resulting mixture was packed in a ceramic firing container and fired in a roller hearth kiln in the same manner as in Example 1 except that firing was performed in an atmosphere gas having an oxygen concentration of 80 vol % under conditions where the maximum firing temperature of 550° C. was maintained for 330 minutes. A lithium-nickel composite oxide was synthesized as Sample 11 in such a manner as described above, and battery characteristics were evaluated in the same manner as in Example 1. As a result, the ratio between lithium metal ratios before and after washing with water was 0.941, the initial discharge capacity was 197.6 mAh/g, and the relative value of positive electrode resistance was 386.

A lithium-nickel composite oxide was synthesized by performing firing using a roller hearth kiln in an atmosphere gas having an oxygen concentration of 80 vol % under conditions where the firing temperature was increased from 600° C. to 650° C. at a constant temperature rise rate over about 100 minutes and then the maximum firing temperature of 650° C. was maintained for 210 minutes. Then, a lithium-nickel composite oxide as Sample 12 was produced and battery characteristics were evaluated in the same manner as in Example 1. As a result, the ratio between lithium metal ratios before and after washing with water was 0.970. The initial discharge capacity was 208.7 mAh/g, and the relative value of positive electrode resistance was 109.

A lithium-nickel composite oxide was synthesized as Sample 13 and battery characteristics were evaluated in the same manner as in the case of Sample 12 except that firing was performed using a roller hearth kiln in an atmosphere gas having an oxygen concentration of 80 vol % under conditions where the firing temperature was increased from 600° C. to 750° C. at a constant temperature rise rate over about 100 minutes and then the maximum firing temperature of 750° C. was maintained for 210 minutes. As a result, the ratio between lithium metal ratios before and after washing with water was 0.971, the initial discharge capacity was 209.8 mAh/g, and the relative value of positive electrode resistance was 100.

A lithium-nickel composite oxide was synthesized as Sample 14 and battery characteristics were evaluated in the same manner as in the case of Sample 12 except that firing was performed using a roller hearth kiln in an atmosphere gas having an oxygen concentration of 80 vol % under conditions where the firing temperature was increased from 600° C. to 850° C. at a constant temperature rise rate over about 100 minutes and then the maximum firing temperature of 850° C. was maintained for 210 minutes. As a result, the ratio between lithium metal ratios before and after washing with water was 0.952, the initial discharge capacity was 199.9 mAh/g, and the relative value of positive electrode resistance was 254.

A lithium-nickel composite oxide was synthesized as Sample 15 and battery characteristics were evaluated in the same manner as in the case of Sample 12 except that firing was performed using a roller hearth kiln in an atmosphere gas having an oxygen concentration of 50 vol % under conditions where the firing temperature was increased from 600° C. to 765° C. at a constant temperature rise rate over about 100 minutes and then the maximum firing temperature of 765° C. was maintained for 210 minutes. As a result, the ratio between lithium metal ratios before and after washing with water was 0.938, the initial discharge capacity was 196.9 mAh/g, and the relative value of positive electrode resistance was 400.

A lithium-nickel composite oxide was synthesized as Sample 16 and battery characteristics were evaluated in the same manner as in the case of Sample 12 except that firing was performed using a roller hearth kiln in an atmosphere gas having an oxygen concentration of 60 vol % under conditions where the firing temperature was increased from 600° C. to 765° C. at a constant temperature rise rate over about 100 minutes and then the maximum firing temperature of 765° C. was maintained for 210 minutes. As a result, the ratio between lithium metal ratios before and after washing with water was 0.954, the initial discharge capacity was 201.8 mAh/g, and the relative value of positive electrode resistance was 251.

A lithium-nickel composite oxide was synthesized as Sample 17 and battery characteristics were evaluated in the same manner as in the case of Sample 12 except that firing was performed using a roller hearth kiln in an atmosphere gas having an oxygen concentration of 70 vol % under conditions where the firing temperature was increased from 600° C. to 765° C. at a constant temperature rise rate over about 100 minutes and then the maximum firing temperature of 765° C. was maintained for 210 minutes. As a result, the ratio between lithium metal ratios before and after washing with water was 0.957, the initial discharge capacity was 202.6 mAh/g, and the relative value of positive electrode resistance was 226.

A lithium-nickel composite oxide was synthesized as Sample 18 and battery characteristics were evaluated in the same manner as in the case of Sample 12 except that firing was performed using a roller hearth kiln in an atmosphere gas having an oxygen concentration of 80 vol % under conditions where the firing temperature was increased from 600° C. to 765° C. at a constant temperature rise rate over about 100 minutes and then the maximum firing temperature of 765° C. was maintained for 100 minutes. As a result, the ratio between lithium metal ratios before and after washing with water was 0.946, the initial discharge capacity was 198.5 mAh/g, and the relative value of positive electrode resistance was 311.

A lithium-nickel composite oxide was synthesized as Sample 19 and battery characteristics were evaluated in the same manner as in the case of Sample 12 except that firing was performed using a roller hearth kiln in an atmosphere gas having an oxygen concentration of 80 vol % under conditions where the firing temperature was increased from 600° C. to 765° C. at a constant temperature rise rate over about 100 minutes and then the maximum firing temperature of 765° C. was maintained for 150 minutes. As a result, the ratio between lithium metal ratios before and after washing with water was 0.953, the initial discharge capacity was 199.7 mAh/g, and the relative value of positive electrode resistance was 262.

Figure 3:
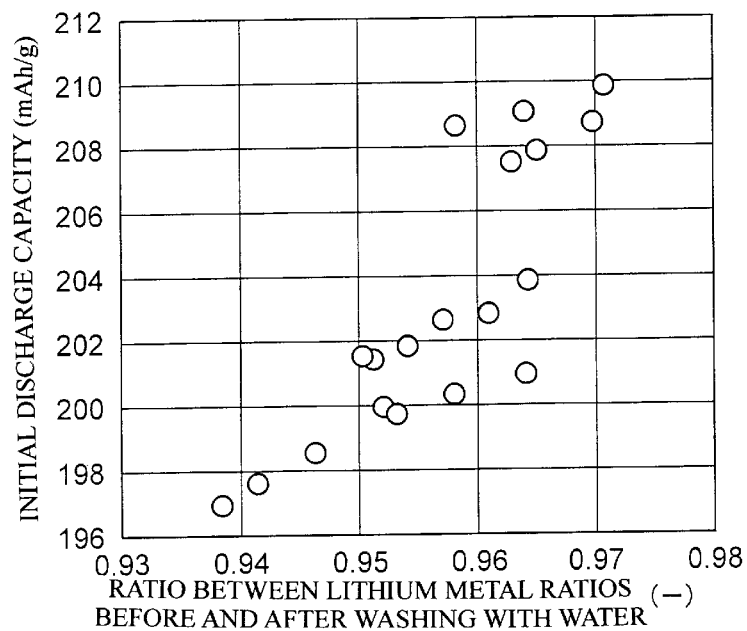
FIG. 3 is a graph obtained by plotting the ratios between lithium metal ratios before and after washing with water and the initial discharge capacities of various lithium-nickel composite oxides produced in Examples of the present invention.
Figure 4:
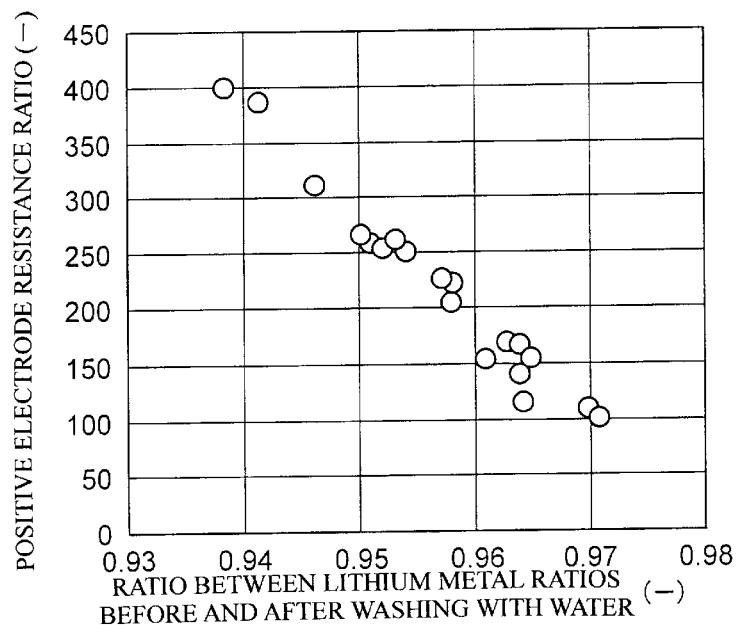
FIG. 4 is a graph obtained by plotting the ratios between lithium metal ratios before and after washing with water and the positive electrode resistances of various lithium-nickel composite oxides produced in Examples of the present invention.

The results shown in Table 1 and FIGS. 3 and 4 reveal that the ratio between lithium metal ratios before and after washing with water correlates with the initial discharge capacity and the positive electrode resistance, and when the ratio between lithium metal ratios before and after washing with water exceeds 0.95, a positive electrode active material having a high discharge capacity and a low positive electrode resistance can stably be obtained.

REFERENCE NUMERALS LIST

1 Coin-type battery
2 Case
2a Positive electrode can
2b Negative electrode can
2c Gasket
3 Electrode
3a Positive electrode
3b Negative electrode
4 Separator
5 Current collector

The invention claimed is:

1. A method for producing a positive electrode active material for a lithium ion secondary battery which contains at least nickel and lithium, the method comprising: a firing process in which a mixture of a nickel compound powder having a volume-average particle diameter MV of 3 μm or more and 26 μm or less and a lithium compound powder having a volume-average particle diameter MV of 14.1 μm or more and 26 μm or less is fired; and a water washing process in which a lithium-nickel composite oxide powder obtained in the firing process is washed with water, wherein the firing process is performed under conditions such that a

TABLE 1

| Samples | Average particle diameter MV (μm) Li hydroxide | Average particle diameter MV (μm) Ni compound for synthesis | Roasting temperature of Ni composite hydroxide (° C.) | Carbon content of Ni compound for synthesis (wt %) | Firing conditions Maximum firing temperature (° C.) | Firing conditions Oxygen concentration in atmosphere (vol %) | Firing conditions Maximum firing temperature holding time (min) | Li metal ratio Before washing with water A | Li metal ratio After washing with water B | Ratio between Li metal ratios before and after washing with water B/A | Battery characteristics Initial discharge capacity (mAh/g) | Battery characteristics Positive electrode resistance (−) |
|---|---|---|---|---|---|---|---|---|---|---|---|---|
| 1 | 14.1 | 11.8 | No roasting | 0.250 | 765 | 80 | 210 | 1.030 | 0.993 | 0.964 | 203.8 | 115 |
| 2 | 15.6 | 11.8 | No roasting | 0.250 | 765 | 80 | 210 | 1.022 | 0.985 | 0.964 | 200.9 | 140 |
| 3 | 18.4 | 11.8 | No roasting | 0.250 | 765 | 80 | 210 | 1.022 | 0.982 | 0.961 | 202.8 | 154 |
| 4 | 20.9 | 11.8 | No roasting | 0.250 | 765 | 80 | 210 | 1.022 | 0.979 | 0.958 | 200.3 | 205 |
| 5 | 25.3 | 11.8 | No roasting | 0.250 | 765 | 80 | 210 | 1.022 | 0.972 | 0.951 | 201.4 | 258 |
| *6 | 25.3 | 11.8 | 400 | 0.210 | 765 | 80 | 210 | 1.024 | 0.973 | 0.950 | 201.5 | 266 |
| 7 | 25.3 | 11.5 | 500 | 0.150 | 765 | 80 | 210 | 1.024 | 0.981 | 0.958 | 208.6 | 222 |
| 8 | 25.3 | 11.6 | 650 | 0.066 | 765 | 80 | 210 | 1.017 | 0.979 | 0.963 | 207.5 | 169 |
| 9 | 25.3 | 11.5 | 700 | 0.042 | 765 | 80 | 210 | 1.019 | 0.982 | 0.964 | 209.0 | 166 |
| 10 | 25.3 | 11.5 | 750 | 0.029 | 765 | 80 | 210 | 1.021 | 0.985 | 0.965 | 207.8 | 154 |
| *11 | 18.4 | 11.6 | 650 | 0.066 | 550 | 80 | 330 | 1.022 | 0.962 | 0.941 | 197.6 | 386 |
| 12 | 18.4 | 11.6 | 650 | 0.066 | 650 | 80 | 210 | 1.022 | 0.991 | 0.970 | 208.7 | 109 |
| 13 | 18.4 | 11.6 | 650 | 0.066 | 750 | 80 | 210 | 1.022 | 0.992 | 0.971 | 209.8 | 100 |
| 14 | 18.4 | 11.6 | 650 | 0.066 | 850 | 80 | 210 | 1.022 | 0.973 | 0.952 | 199.9 | 254 |
| *15 | 18.4 | 11.6 | 650 | 0.066 | 765 | 50 | 210 | 1.022 | 0.959 | 0.938 | 196.9 | 400 |
| 16 | 18.4 | 11.6 | 650 | 0.066 | 765 | 60 | 210 | 1.022 | 0.975 | 0.954 | 201.8 | 251 |
| 17 | 18.4 | 11.6 | 650 | 0.066 | 765 | 70 | 210 | 1.022 | 0.978 | 0.957 | 202.6 | 226 |
| *18 | 18.4 | 11.6 | 650 | 0.066 | 765 | 80 | 100 | 1.022 | 0.967 | 0.946 | 198.5 | 311 |
| 19 | 18.4 | 11.6 | 650 | 0.066 | 765 | 80 | 150 | 1.022 | 0.974 | 0.953 | 199.7 | 262 |

(Note)
Samples marked with * in the table are Comparative Examples.

value obtained by dividing a ratio of an amount-of-substance of lithium to a total amount-of-substance of transition metals other than lithium in the lithium-nickel composite oxide powder after the washing with water by a ratio of an amount-of-substance of lithium to a total amount-of-substance of transition metals other than lithium in the lithium-nickel composite oxide powder before the washing with water exceeds 0.95.

2. The method for producing a positive electrode active material for a lithium ion secondary battery according to claim 1, wherein the nickel compound powder has a carbon content of 0.25 mass % or less.

3. The method for producing a positive electrode active material for a lithium ion secondary battery according to claim 1, wherein the nickel compound powder is a powder of nickel oxide or nickel hydroxide.

4. The method for producing a positive electrode active material for a lithium ion secondary battery according to claim 1, wherein the lithium compound powder is a powder of lithium hydroxide or lithium hydroxide hydrate.

5. The method for producing a positive electrode active material for a lithium ion secondary battery according to claim 1, wherein an atmosphere gas in which the mixture of the nickel compound powder and the lithium compound powder is fired has an oxygen concentration of 60 vol % or more.

6. The method for producing a positive electrode active material for a lithium ion secondary battery according to claim 1, wherein the nickel compound powder includes a powder of a composite oxide of nickel and another transition metal or a powder of a composite hydroxide of nickel and another transition metal.

7. The method for producing a positive electrode active material for a lithium ion secondary battery according to claim 1, wherein a maximum firing temperature in the firing process is 650° C. or higher and 850° C. or lower, and a time during which the maximum firing temperature is maintained is 2 hours or longer.

8. The method for producing a positive electrode active material for a lithium ion secondary battery according to claim 1, further comprising, before the firing process, a preprocessing process in which the nickel compound powder is roasted at a roasting temperature of 500° C. or higher and 800° C. or lower so as to be converted to a nickel oxide powder.

9. The method for producing a positive electrode active material for a lithium ion secondary battery according to claim 1, wherein the lithium-nickel composite oxide is represented by a general formula, $Li_xNi_{1-y-z}M_yN_zO_2$ (wherein M is at least one element selected from Co and Mn, N is at least one element selected from Al, Ti, Nb, V, Mg, W, and Mo, x is 0.90 to 1.10, y is 0.05 to 0.35, and Z is 0.005 to 0.05).

10. The method for producing a positive electrode active material for a lithium ion secondary battery according to claim 2, wherein the nickel compound powder is a powder of nickel oxide or nickel hydroxide.

11. The method for producing a positive electrode active material for a lithium ion secondary battery according to claim 2, wherein the lithium compound powder is a powder of lithium hydroxide or lithium hydroxide hydrate.

12. The method for producing a positive electrode active material for a lithium ion secondary battery according to claim 2, wherein an atmosphere gas in which the mixture of the nickel compound powder and the lithium compound powder is fired has an oxygen concentration of 60 vol % or more.

13. The method for producing a positive electrode active material for a lithium ion secondary battery according to claim 2, wherein the nickel compound powder includes a powder of a composite oxide of nickel and another transition metal or a powder of a composite hydroxide of nickel and another transition metal.

14. The method for producing a positive electrode active material for a lithium ion secondary battery according to claim 2, wherein a maximum firing temperature in the firing process is 650° C. or higher and 850° C. or lower, and a time during which the maximum firing temperature is maintained is 2 hours or longer.

15. The method for producing a positive electrode active material for a lithium ion secondary battery according to claim 2, further comprising, before the firing process, a preprocessing process in which the nickel compound powder is roasted at a roasting temperature of 500° C. or higher and 800° C. or lower so as to be converted to a nickel oxide powder.

* * * * *